(12) United States Patent
Balan (10) Patent No.: US 11,821,338 B2
(45) Date of Patent: Nov. 21, 2023

(54) 360° ADVANCED ROTATION SYSTEM

(71) Applicant: Alexandru Balan, Chicago, IL (US)

(72) Inventor: Alexandru Balan, Chicago, IL (US)

(73) Assignee: Alexandru Balan, Chicago, IL (US)

(*) Notice: Subject to any disclaimer, the term of this patent is extended or adjusted under 35 U.S.C. 154(b) by 0 days.

(21) Appl. No.: 17/642,359

(22) PCT Filed: Sep. 11, 2020

(86) PCT No.: PCT/US2020/050391
§ 371 (c)(1),
(2) Date: Mar. 11, 2022

(87) PCT Pub. No.: WO2021/076250
PCT Pub. Date: Apr. 22, 2021

(65) Prior Publication Data
US 2022/0221029 A1    Jul. 14, 2022

Related U.S. Application Data (60) Provisional application No. 62/898,733, filed on Sep. 11, 2019.

(51) Int. Cl.
| F01D 7/00 | (2006.01) |
| F16H 7/08 | (2006.01) |
| B64C 29/00 | (2006.01) |

(52) U.S. Cl.
CPC ............ F01D 7/00 (2013.01); B64C 29/0033 (2013.01); F16H 7/08 (2013.01); F05D 2220/90 (2013.01); F16H 2007/0865 (2013.01)

(58) Field of Classification Search
CPC ... B64C 29/0033; B64C 11/001; B64C 27/52; B64C 2201/162; B64C 11/00; F01D 7/00; F16H 7/023; F16H 7/08; F16H 2007/0865; F05D 2220/90; B64D 27/24
See application file for complete search history.

(56) References Cited

U.S. PATENT DOCUMENTS

| 2,077,471 A | * | 4/1937 | Fink | ..................... | B64C 29/0025 244/12.3 |
| 2,604,950 A | * | 7/1952 | Sipe | ..................... | B64C 39/006 416/126 |
| 2,876,965 A | * | 3/1959 | Streib | ..................... | B64C 39/06 244/52 |
| 3,041,012 A | * | 6/1962 | Gibbs | ..................... | B64C 27/16 416/129 |
| 3,082,977 A | * | 3/1963 | Arlin | ..................... | B64C 29/0025 244/92 |
| 3,184,183 A | * | 5/1965 | Plasecki | ..................... | B64C 27/20 244/23 R |

(Continued)

FOREIGN PATENT DOCUMENTS

| CN | 104943488 B | 12/2017 |
| CN | 107499078 A | 12/2017 |

OTHER PUBLICATIONS

International Search Report and Written Opinion filed in PCT/US20/050391, dated Apr. 2, 2021. 8 pgs.

Primary Examiner — Medhat Badawi
(74) Attorney, Agent, or Firm — Vedder Price P.C.

(57) ABSTRACT

The present invention relates generally to propulsion systems and, more specifically, to propulsion systems configured to vector and provide directional thrust such as those that may be used in aircraft or watercraft. Such propulsion systems may be used in connection with unmanned aerial vehicles, other aircraft, or various watercraft including submersibles.

17 Claims, 10 Drawing Sheets

(56) References Cited

U.S. PATENT DOCUMENTS

| | | | | |
|---|---|---|---|---|
| 3,437,290 A * | 4/1969 | Norman | B64C 27/20 | 244/135 R |
| 3,470,765 A * | 10/1969 | Campbell | B64C 11/48 | 416/129 |
| 3,507,461 A * | 4/1970 | Rosta | B64C 39/001 | D12/325 |
| 3,514,053 A * | 5/1970 | McGuinness | B64C 39/001 | 244/23 C |
| 3,632,065 A * | 1/1972 | Rosta | B64C 27/20 | 244/17.11 |
| 3,914,629 A * | 10/1975 | Gardiner | H02K 25/00 | 310/46 |
| 3,997,131 A * | 12/1976 | Kling | B64D 27/24 | 416/129 |
| 4,478,379 A * | 10/1984 | Kerr | B64C 39/024 | 244/17.11 |
| 4,778,128 A * | 10/1988 | Wright | B64C 39/064 | D12/333 |
| 4,880,071 A * | 11/1989 | Tracy | B64C 29/0033 | 244/12.3 |
| 4,953,811 A * | 9/1990 | Smith | B64C 27/82 | 244/17.19 |
| 5,303,879 A * | 4/1994 | Bucher | B64C 29/0025 | 244/23 B |
| 5,318,248 A * | 6/1994 | Zielonka | B64C 27/20 | 244/17.11 |
| 5,351,911 A * | 10/1994 | Neumayr | B64C 39/06 | D12/325 |
| 5,454,531 A * | 10/1995 | Melkuti | B64C 29/0025 | 244/12.6 |
| 5,653,404 A * | 8/1997 | Ploshkin | B63G 8/08 | 244/73 C |
| 6,308,912 B1 * | 10/2001 | Kirjavainen | B64C 27/08 | 244/17.11 |
| 6,382,560 B1 * | 5/2002 | Ow | B64D 27/20 | 244/23 C |
| 6,398,159 B1 * | 6/2002 | Di Stefano | B64C 39/06 | 244/6 |
| 6,450,446 B1 * | 9/2002 | Holben | B64C 27/00 | 244/6 |
| 6,581,872 B2 * | 6/2003 | Walmsley | B64C 39/024 | 244/12.4 |
| 7,249,732 B2 * | 7/2007 | Sanders, Jr. | B64C 27/12 | 244/12.1 |
| 7,472,863 B2 * | 1/2009 | Pak | B64D 35/04 | 244/12.5 |
| 7,520,466 B2 * | 4/2009 | Bostan | B64C 27/20 | 244/12.3 |
| 7,604,198 B2 * | 10/2009 | Petersen | B64C 27/10 | 244/17.23 |
| 8,123,460 B2 * | 2/2012 | Collette | B64D 13/006 | 361/699 |
| 8,240,597 B2 * | 8/2012 | Entsminger | B64C 27/20 | 244/23 C |
| 8,251,307 B2 * | 8/2012 | Goossen | B64C 39/024 | 244/76 R |
| 8,322,649 B2 * | 12/2012 | Martin | B64C 29/0025 | 244/23 C |
| 8,348,190 B2 * | 1/2013 | Fleming | B64C 39/024 | 244/23 D |
| 8,375,837 B2 * | 2/2013 | Goossen | F41H 13/0006 | 244/110 F |
| 8,387,911 B2 * | 3/2013 | Collette | B64C 27/20 | 244/7 B |
| 8,464,978 B2 * | 6/2013 | Yim | B64C 27/20 | 244/17.23 |
| 8,496,200 B2 * | 7/2013 | Yoeli | B64C 29/0025 | 244/23 B |
| 8,651,432 B2 * | 2/2014 | De Roche | B64C 27/20 | 244/221 |
| 8,821,123 B2 * | 9/2014 | Camci | F04D 29/541 | 416/189 |
| 8,833,692 B2 * | 9/2014 | Yoeli | B64C 29/0025 | 244/23 A |
| 8,876,038 B2 * | 11/2014 | Yoeli | B64C 27/20 | 244/23 A |
| 8,925,665 B2 * | 1/2015 | Trojahn | B60V 1/15 | 180/117 |
| 8,931,732 B2 * | 1/2015 | Sirohi | B64C 27/22 | 244/17.21 |
| 8,960,592 B1 * | 2/2015 | Windisch | A63H 30/04 | 244/12.5 |
| 8,979,016 B2 * | 3/2015 | Hayden, III | B64C 27/46 | 244/17.11 |
| 8,998,126 B2 * | 4/2015 | Alvarado Valverde | B64C 39/064 | 244/12.2 |
| 9,004,396 B1 * | 4/2015 | Colin | B64D 47/08 | 244/17.23 |
| 9,071,367 B2 * | 6/2015 | Abhyanker | H04W 4/90 | |
| 9,085,355 B2 * | 7/2015 | DeLorean | B64C 39/12 | |
| 9,102,397 B2 * | 8/2015 | Wood | B64C 11/18 | |
| 9,156,549 B2 * | 10/2015 | Vetters | B64C 29/0025 | |
| 9,248,909 B2 * | 2/2016 | Eller | H02K 99/10 | |
| 9,272,779 B2 * | 3/2016 | Groenewald | A63H 27/12 | |
| 9,373,149 B2 * | 6/2016 | Abhyanker | G05D 1/0238 | |
| 9,439,367 B2 * | 9/2016 | Abhyanker | A01G 25/16 | |
| 9,441,981 B2 * | 9/2016 | Abhyanker | H04W 4/02 | |
| 9,446,844 B2 * | 9/2016 | Jung | B60F 5/02 | |
| 9,451,020 B2 * | 9/2016 | Liu | H04L 43/0811 | |
| 9,457,901 B2 * | 10/2016 | Bertrand | B33Y 80/00 | |
| 9,459,622 B2 * | 10/2016 | Abhyanker | G05D 1/0088 | |
| 9,561,851 B2 * | 2/2017 | Hayden, III | B64C 27/46 | |
| 9,688,396 B2 * | 6/2017 | Avery, III | B64C 1/0009 | |
| 9,714,020 B1 * | 7/2017 | Bennett, Jr. | B60V 1/15 | |
| 9,849,980 B2 * | 12/2017 | Li | B63H 11/04 | |
| 9,971,985 B2 * | 5/2018 | Abhyanker | B61L 27/04 | |
| 10,059,437 B2 * | 8/2018 | Cooper | A63H 27/12 | |
| 10,107,196 B2 * | 10/2018 | Devine | F02K 3/077 | |
| 10,112,700 B1 * | 10/2018 | Birch | B64F 1/06 | |
| 10,118,696 B1 * | 11/2018 | Hoffberg | B64C 39/001 | |
| 10,345,818 B2 * | 7/2019 | Sibley | B25J 9/1694 | |
| 10,377,476 B2 * | 8/2019 | Mohyi | B64C 29/0025 | |
| 10,423,831 B2 * | 9/2019 | De Mers | G01M 5/0075 | |
| 10,464,668 B2 * | 11/2019 | Evulet | B64C 29/02 | |
| 10,518,595 B2 * | 12/2019 | Dietrich | B64D 35/02 | |
| 10,618,650 B2 * | 4/2020 | Hasinski | B64C 39/028 | |
| 10,669,042 B2 * | 6/2020 | Molnar | B64D 47/04 | |
| 10,696,395 B2 * | 6/2020 | Molnar | B64F 3/02 | |
| 10,730,622 B2 * | 8/2020 | Groninga | B64C 9/00 | |
| 10,745,126 B2 * | 8/2020 | Molnar | G03B 21/562 | |
| 10,875,658 B2 * | 12/2020 | Evulet | F02K 1/002 | |
| 10,994,838 B2 * | 5/2021 | DeLorean | B64C 27/32 | |
| 11,001,378 B2 * | 5/2021 | Evulet | B64C 3/16 | |
| 11,059,601 B2 * | 7/2021 | Molnar | G09F 19/18 | |
| 11,067,164 B2 * | 7/2021 | Henion | F16H 59/10 | |
| 11,142,308 B2 * | 10/2021 | Bucheru | B60V 3/08 | |
| 11,148,801 B2 * | 10/2021 | Evulet | B64C 39/12 | |
| 11,267,568 B2 * | 3/2022 | Sun | B64C 39/024 | |
| 11,352,132 B2 * | 6/2022 | Breeze-Stringfellow | B64C 11/001 | |
| 11,511,854 B2 * | 11/2022 | Baity | B64C 27/08 | |
| 2003/0136875 A1 * | 7/2003 | Pauchard | B64C 27/10 | 244/17.11 |
| 2005/0067527 A1 * | 3/2005 | Petersen | B64C 27/10 | 244/17.11 |
| 2007/0272796 A1 * | 11/2007 | Stuhr | B64D 27/12 | 244/54 |
| 2010/0320333 A1 * | 12/2010 | Martin | B64C 39/001 | 244/23 C |
| 2011/0163199 A1 * | 7/2011 | Cardozo | B64C 27/20 | 244/17.23 |
| 2012/0049009 A1 * | 3/2012 | Kissel, Jr. | F41H 5/24 | 244/23 C |
| 2013/0306802 A1 * | 11/2013 | Hayden, III | B64C 39/024 | 244/23 C |
| 2015/0251757 A1 * | 9/2015 | Hayden, III | B64C 29/00 | 244/17.23 |

(56) References Cited

U.S. PATENT DOCUMENTS

| | | | |
|---|---|---|---|
| 2019/0144107 A1* | 5/2019 | Rudraswamy | B64C 27/28 244/7 A |
| 2022/0106039 A1* | 4/2022 | Müller | B64D 27/24 |
| 2022/0221029 A1* | 7/2022 | Balan | B64C 11/00 |

* cited by examiner

360° ADVANCED ROTATION SYSTEM

CROSS-REFERENCE TO RELATED APPLICATIONS

This application is a National Phase Application claiming priority to PCT Application No. PCT/US20/50391, filed on Sep. 11, 2020 which claims the benefit of and priority from U.S. Provisional Patent Application Ser. No. 62/898,733, filed on Sep. 11, 2019, the contents of which are hereby fully incorporated herein by reference in their entirety.

FIELD OF THE INVENTION

The present invention relates generally to propulsion systems and, more specifically, to a system configured to rotate, vector and tilt and provide directional thrust such as those that may be used in aircraft or watercraft.

BACKGROUND OF THE INVENTION

Existing propulsion devices generally rely upon a turning arm comprising a discrete axle or integrated axle, which is used as a fixed articulated arm for the propulsion system. One such example is a conventional ducted fan propulsion system. These types of propulsion systems may be used in a variety of applications, including aircraft, unmanned aerial vehicles, submersibles, and other watercraft.

However, existing propulsion devices such as conventional ducted fan systems suffer from a number of disadvantages.

First, the fixed arm holding the propulsion system allows the propulsion system to rotate and vector about only a single axis of rotation. The propulsion system is thus incapable of providing thrust in multiple different axial directions.

Second, the limited (if any) movement provided by the articulated arm in conventional systems results in low maneuverability of the vehicle to which the propulsion system is mounted.

Third, the low maneuverability of a vehicle using a conventional propulsion system is directly proportional to high-energy consumption of the propulsion system.

Fourth, in the case of a turbo propeller device included in a propulsion system with a fixed structure with one degree of articulated rotation (as may be found, for example, on the Bell V-22 Osprey helicopter), the arm is capable of moving only vertically, horizontally, or in some combination thereof.

The foregoing disadvantages limit the variety of maneuvers of the vehicle to which the propulsion system is mounted. Accordingly, there exists a need for an improved propulsion system that provides greater flexibility in the orientation of the propulsion device.

SUMMARY

Embodiments of the present disclosure are directed towards an improved propulsion device (termed an "advanced rotation system," "ARS," "360° Advanced Rotation System," or "ARS 360°" herein) that addresses the foregoing disadvantages, saving resources and energy through its ability to work with all types of maneuvers in three coordinates, of two-degree rotation process.

Embodiments of the present disclosure are directed to an improved propulsion device capable of two-plane rotation.

Embodiments of the present disclosure are directed to a conceptual and constructive improvement of propulsion devices widely applied to aviation propulsion systems. In an embodiment, an improved propulsion device in accordance with the present disclosure comprises an assembly made of a universal support, articulated and mechanized by two levers that take up the movement unison and/or independently of the two electric dumb shaft through two transmission discs.

In an embodiment, an improved propulsion device in accordance with the present disclosure comprises integrating rotating mechanisms into a set of discs, overlaid and articulated with the outgoing transmission, offering two degrees of freedom that reduce the weight and a compact form factor. Transmissions are made with levers and transmission belts that ensure high movability.

In an embodiment, an improved propulsion device in accordance with the present disclosure comprises an intermediate articulated mechanism between a ducted fan or double ducted fan propulsion device and a wing and/or fuselage of any aerial or aquatic vehicle. Such improved propulsion devices are lightweight, with a minimal number of components, easy to build, conceptually scalable, and easy to maintain. Embodiments of improved propulsion devices in accordance with the present disclosure may be used to improve the flying qualities of drones and other aircrafts, as well as the aquatic performance of naval vessels by improving the ability of conventional propulsion systems to increase maneuverability required for use by either an automated control system or a pilot.

In an embodiment, an improved propulsion device in accordance with the present disclosure comprises an advanced rotation system that may be applied to various flight apparatuses such as drones and traditional aircraft, automated by the two-plane movements, which greatly increases the productivity of a standard ducted fan. In embodiments, the control of the working process is provided by an electronic computing and/or control device via electrical cables, fiber optics, or wireless technology.

In an embodiment, an improved propulsion device in accordance with the present disclosure comprises an ARS 100 comprising a first rotatable mounting bracket 402 comprising structural members 26, 27, and 28 and a second rotatable mounting bracket 404 comprising structural members 26, 27, and 28 and brace 41. Each of mounting brackets 402, 404 is rotatably coupled a respective chassis 30 via a bearing 302. The chassis 30 is in turn movably coupled to tracks on an inner surface of outer housing 29 by bearings 202, permitting the chasses 30 to move about the inner surface of the housing 29. The top rim 32a and bottom rim 32b are movably mounted to the outer housing 29 via a plurality of bearings 202. Two wire cables 302 pass through housing 29 (and are thereby operative connected to the housing 29) and are also each operatively connected with the a respective one of the chasses 30. A transmission belt 40a extends about the outside of the top rim 32a and while a second transmission belt 40b extends about the outside of the bottom rim 32b. The transmission belts 40a, 40b are operative engaged with the rims 32a, 32b via a plurality teeth on the inner surface of the transmission belts 40a, 40b and the outer surface of the rims 32a, 32b. The transmission belts 40a, 40b are each engaged with respective motors/reducers 33a, 33b, each of which is mounted to a respective toothed wheel 35a and 35b (also termed a gear) and a pair of pretensioner rollers 36. Bracket 41 is connected to levers 34a and 34b, which interlock with the top rim 32a and the bottom rim 32b. Top rim 32a and bottom rim 32b are fastened to the transmission belts 40a, 40b via gears 35a and 35b. In use, the mounting brackets 402, 404 connect the ARS 100 to the propulsion device. The mounting brackets 402, 404 are configured to rotate about a first axis, permitting the propulsion system 102 to pitch relative to the ARS 100. The mounting brackets 402, 404 are also configured to move about the housing 29, thereby rotating the propulsion device about a second axis. The movement and rotation of the mounting brackets 402, 404 is controlled by the movement of transmission belts 40a, 40b (which cause top rim 32a and bottom rim 32b to rotate). As top rim 32a and bottom rim 32b rotate in opposite directions, mounting brackets 402, 404 rotate about the first axis. As top rim 32a and bottom rim 32b rotate in the same direction, mounting brackets 402, 404 move about the housing. By controlling the movement of transmission belts 40a, 40b, the orientation of the propulsion system can thereby be controlled about two axes.

Embodiments of improved propulsion devices in accordance with the present disclosure may comprise alloys, polymers, rigid, elastic, and flexible composite materials in various proportions. In an embodiment, an ARS is formed from substantially the following elements: 50% titanium; 20% aluminum T6; 5% carbon fiber; 15% rubber reinforced with Kevlar; and 10% polymers.

Additional aspects of the disclosure will be apparent to those of ordinary skill in the art in view of the detailed description of various embodiments, which is made with reference to the drawings, a brief description of which is provided below.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Figure 1:
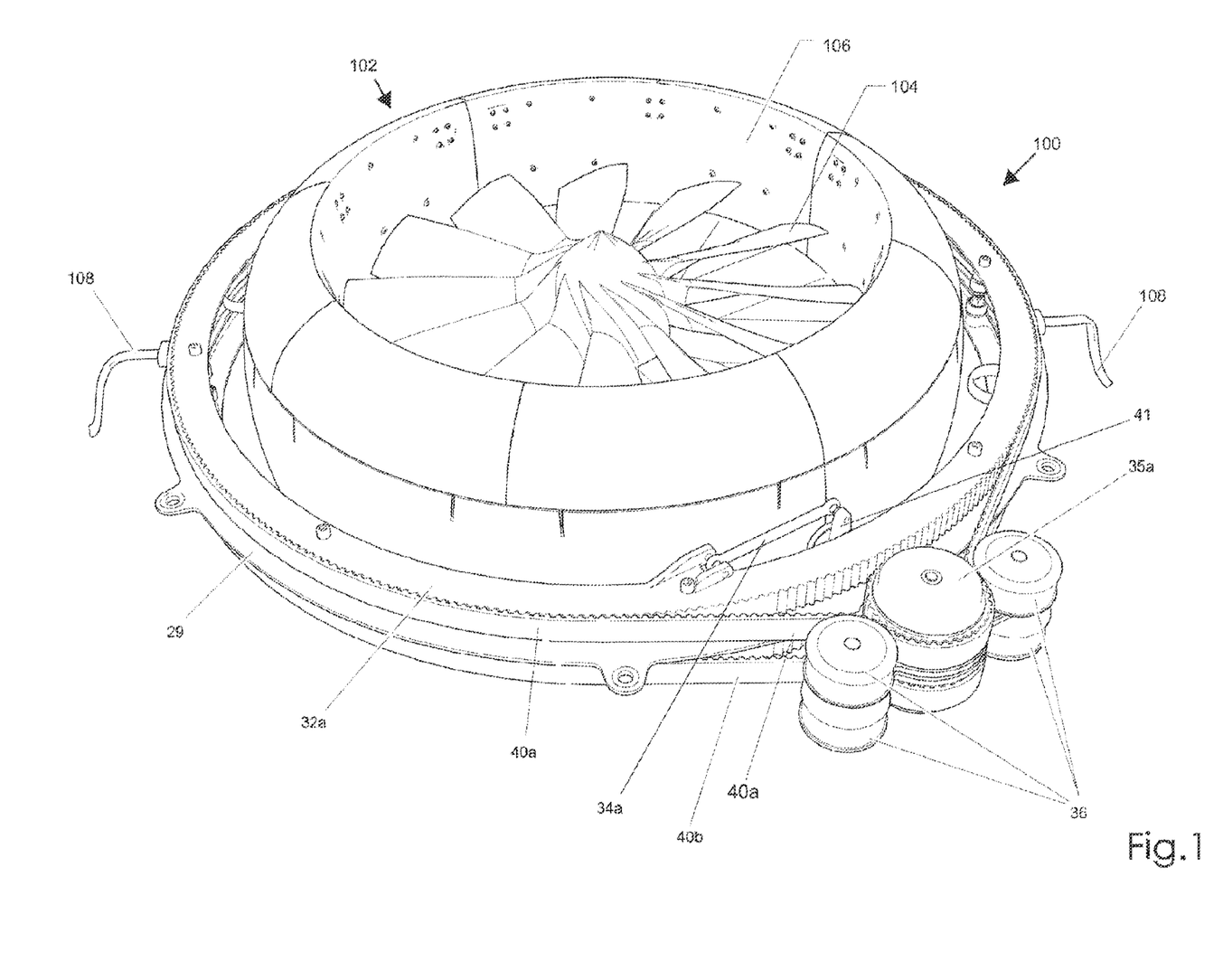
FIG. 1 is a top perspective view of an ARS in accordance with an embodiment of the present disclosure integrated with a ducted fan.

Referring to FIG. 1 an ARS 100 in accordance with an embodiment of the present disclosure is shown in its initial position for calibrating electronic positioning components mounted to a ducted fan 102. As shown, the ducted fan 102 is an air moving arrangement comprising a mechanical fan 104 (also termed a propeller) mounted within a cylindrical shroud 106 (also termed a duct). The ARS 100 surrounds and is mounted to the shroud 106 of the ducted fan 102.

Figure 2:
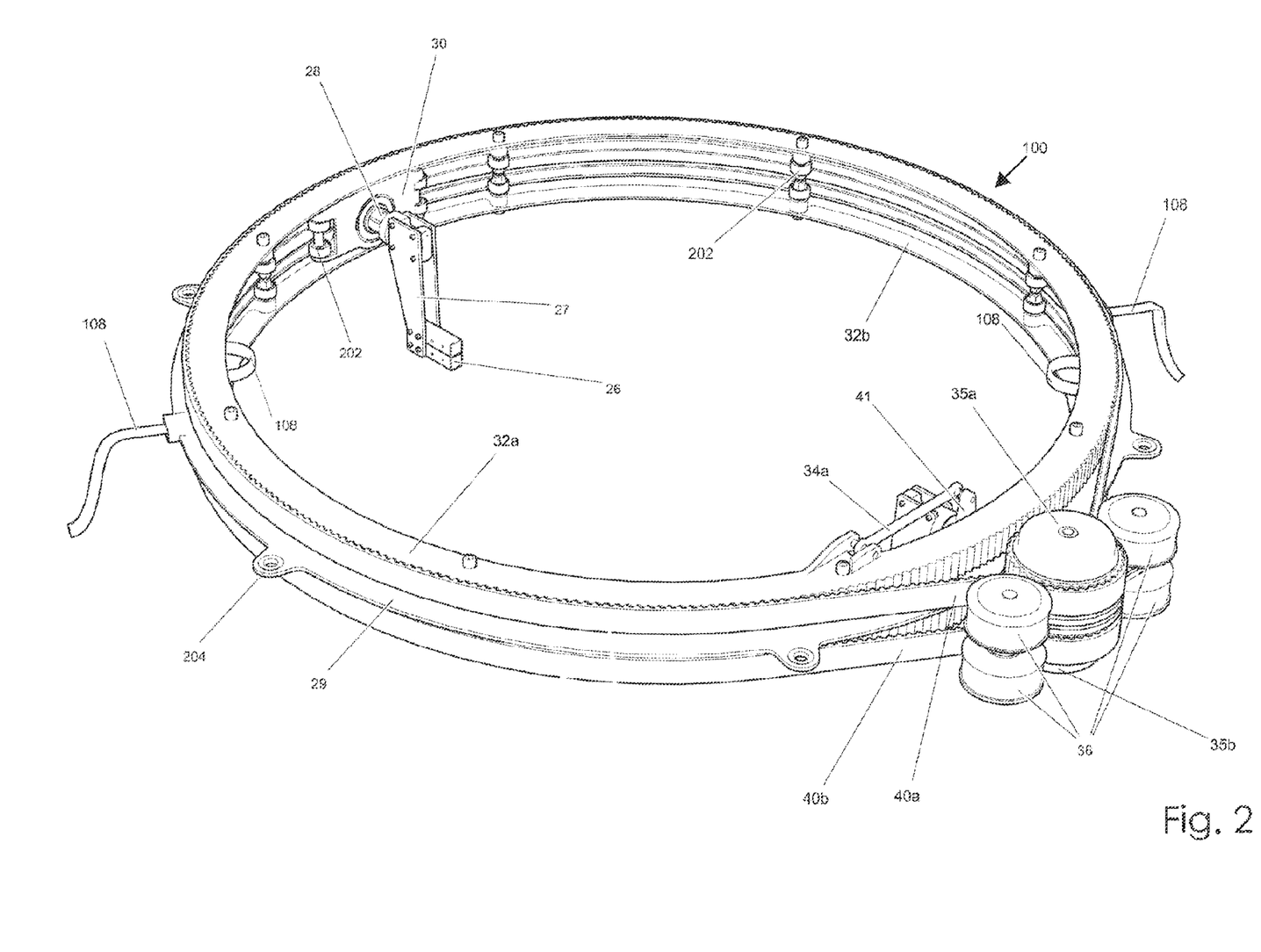
FIG. 2 is a top perspective view of the ARS of FIG. 1.

Referring to FIG. 2, an ARS 100 is shown alone (without the accompanying ducted fan 102 propulsion device).

Figure 3:
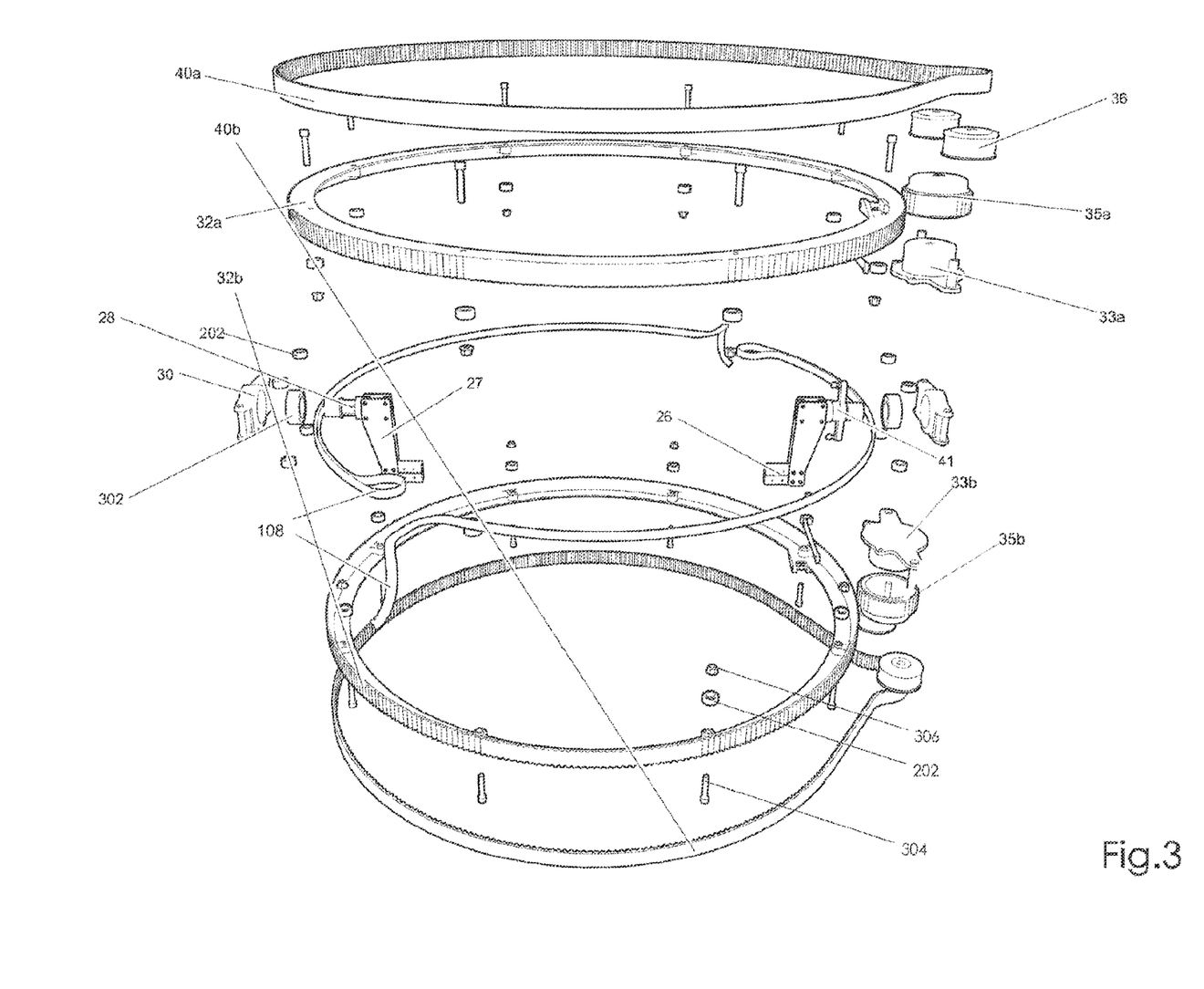
FIG. 3 is a perspective exploded view of the ARS of FIG. 1 without component 29.

FIG. 3 depicts an exploded view of the ARS 100 of FIG. 1 with the housing 29 omitted so as to better view the other elements. As shown, a transmission belt 40a surrounds the top rim 32a and passes between the top gear 35a and a pair of pretensioner rollers 36. A second transmission belt 40b surrounds the bottom rim 32b and passes between the bottom gear 35b and a pair of pretensioner rollers 36. Screws or bolts 304 each pass through a respective opening in the top rim 32a or bottom rim 32b, which optionally feature extrusions 1002 adapted to receive the screw or bolt 304 and support a bearing 202. Each screw or bolt 304 rotatably supports a bearing 202 and is secured to a nut 306.

The bearings 202 permit the top rim 32a and bottom rim 32b to each independently rotate with respect to the housing 29. The bearings 202 rest against the inner surface of the housing 29 and move freely across that surface.

Wire cables 108 pass through housing 29 such that the enclosures 30 are operatively connected to the wire cables 108.

Figure 4:
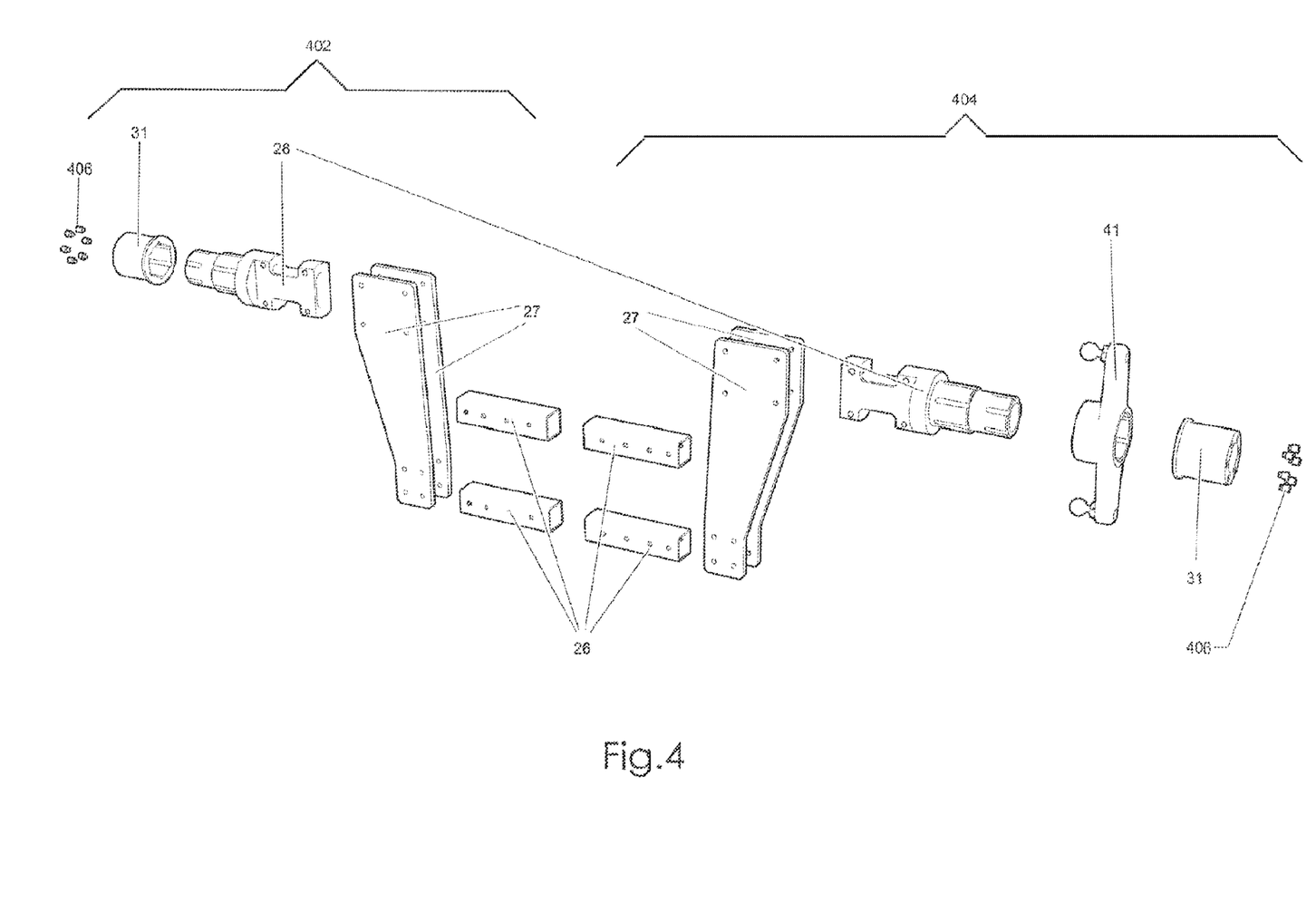
FIG. 4 is a perspective exploded view of the basic joint arm of the ARS of FIG. 1.

FIG. 4 depicts an exploded view of mounting brackets 402, 404 in accordance with the present disclosure which connect the ARS 100 to a propulsion system, such as ducted fan 102. As will be clear to one of skill in the art, these mounting brackets 402, 404 may be adapted so as to connect the ARS 100 to any ducted fan or cylindrical propulsion system. For example, the size of components 26 and 27 may be selected based on the specific requirements of the propulsion system. A plurality of screws 406 or other connective elements are used to secure components of the mounting brackets 402, 404 together.

Figure 5:
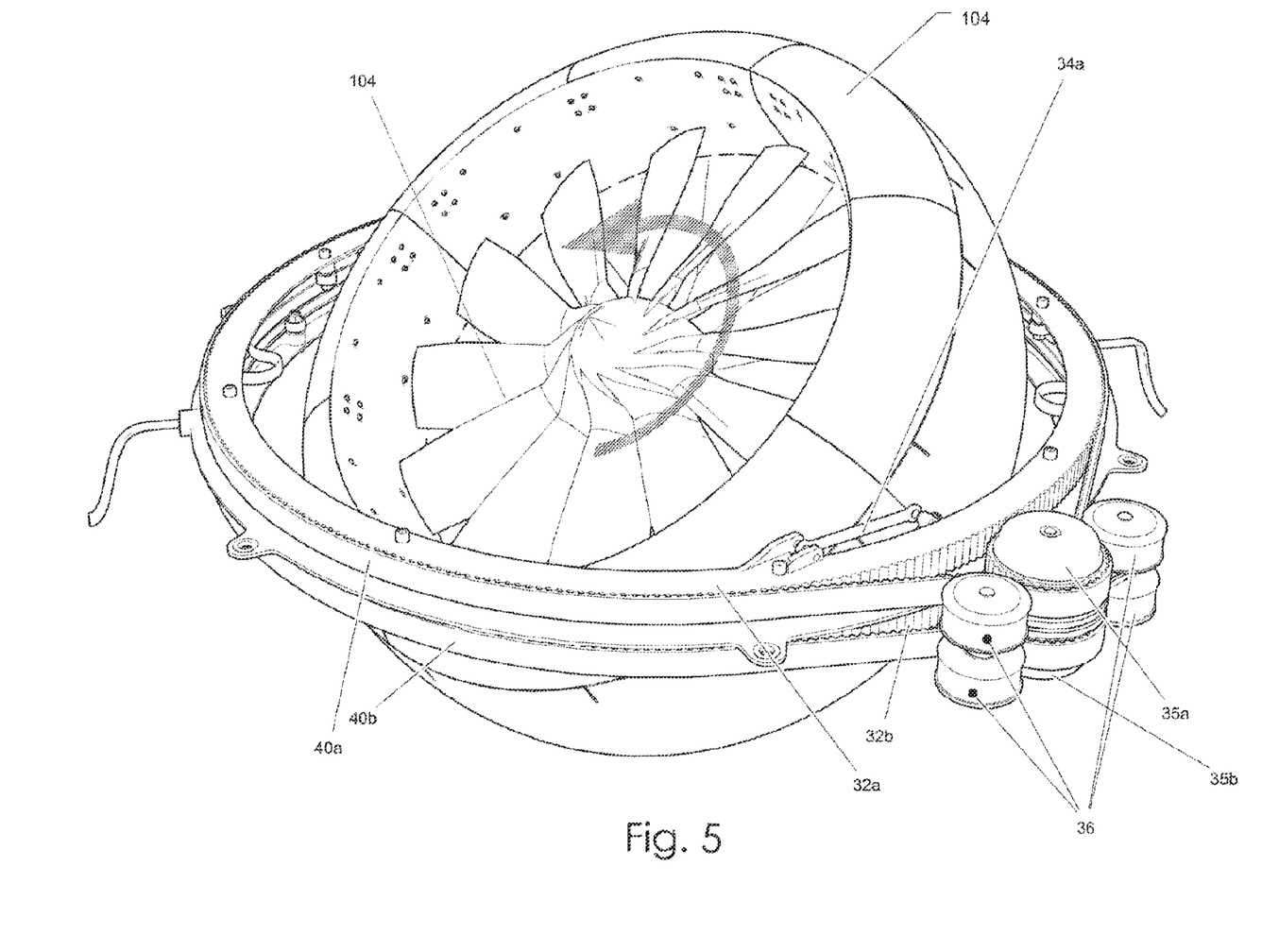
FIG. 5 is a perspective view of the changing the angle of inclination of the ARS of FIG. 1.

FIG. 5 depicts an embodiment of an ARS 100 with an integrated ducted fan 102, showing the ducted fan 102 pitched forward. The inclination of the ducted fan 102 is accomplished through the opposite rotation of the top rim 32a and bottom rim 32b.

Figure 6:
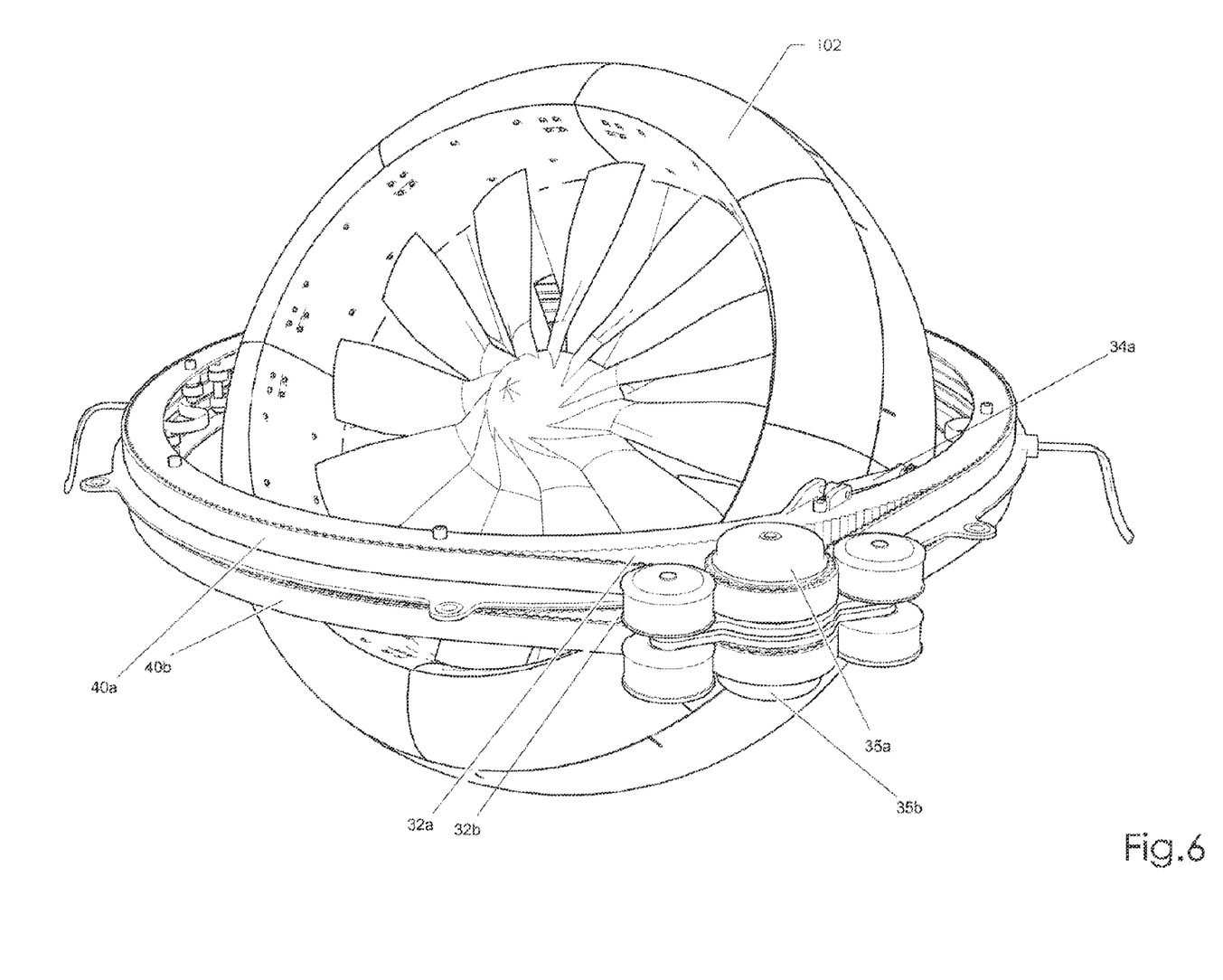
FIG. 6 is a perspective view of the tilt rotation of the ARS of FIG. 1.

FIG. 6 depicts an embodiment of an ARS with integrated ducted fan, whereby arrows demonstrate the rotation process on the vertical axis to the component 29 due to the unidirectional rotation of the components 32a and 32b.

Figure 7:
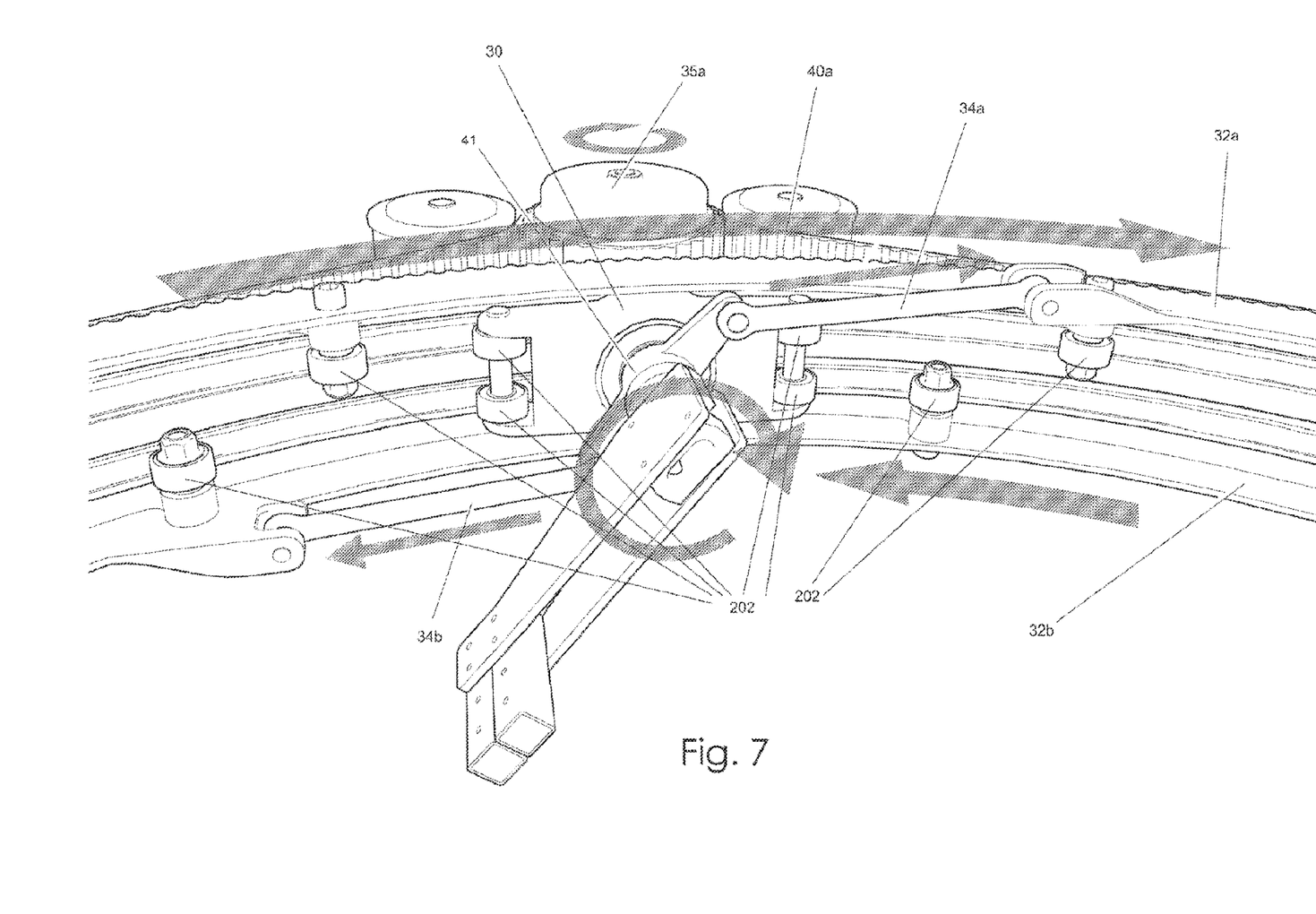
FIG. 7 is a detailing view of how the changing of the angle of the ARS of FIG. 1 works.

Referring to FIG. 7, through the arrows, the kinematic process of changing the angle of an ARS100 to allow for a vertical inclination is shown.

Figure 8:
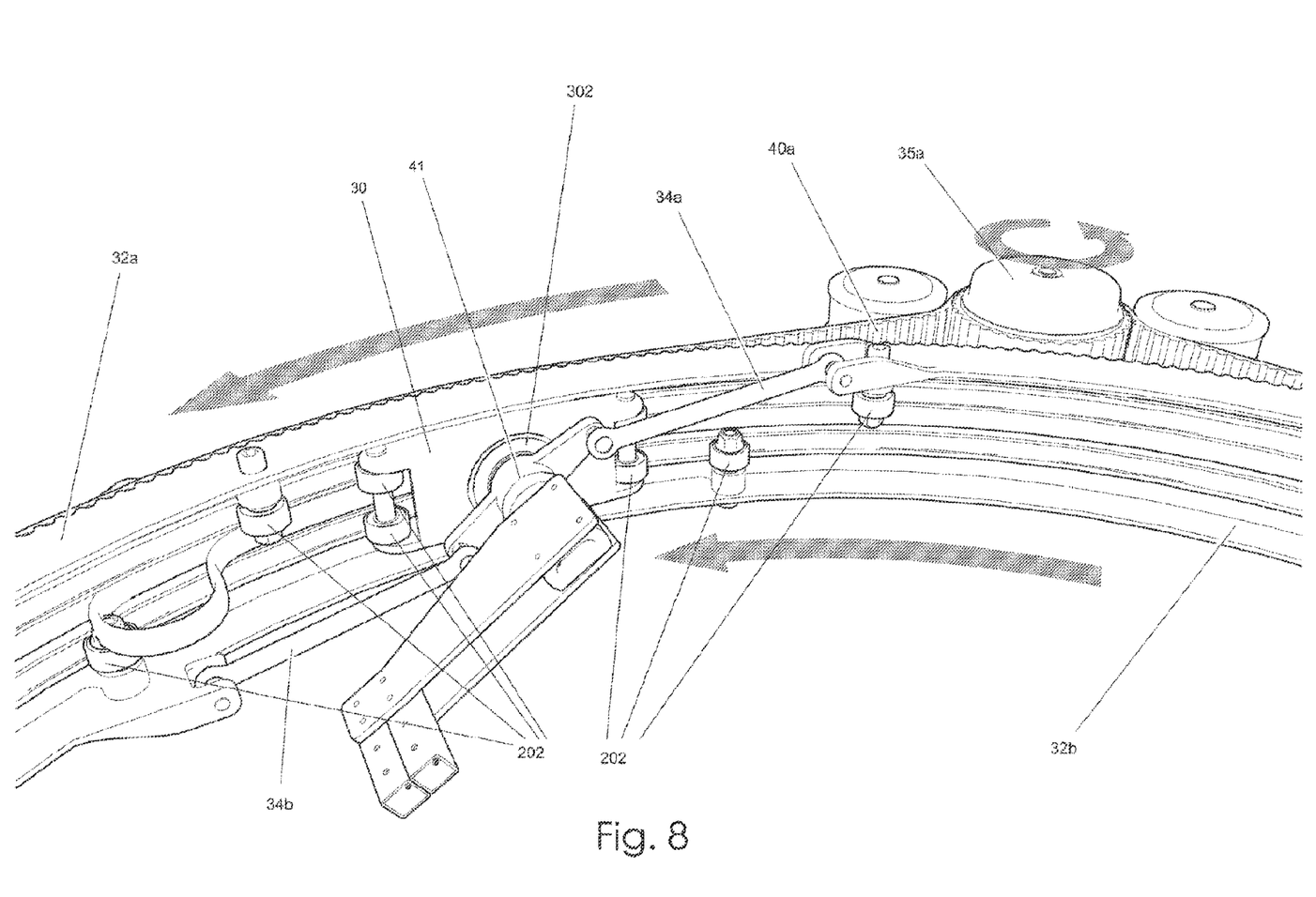
FIG. 8 is detailing view of how the tilt rotation of the ARS of FIG. 1 works.
Figure 9:
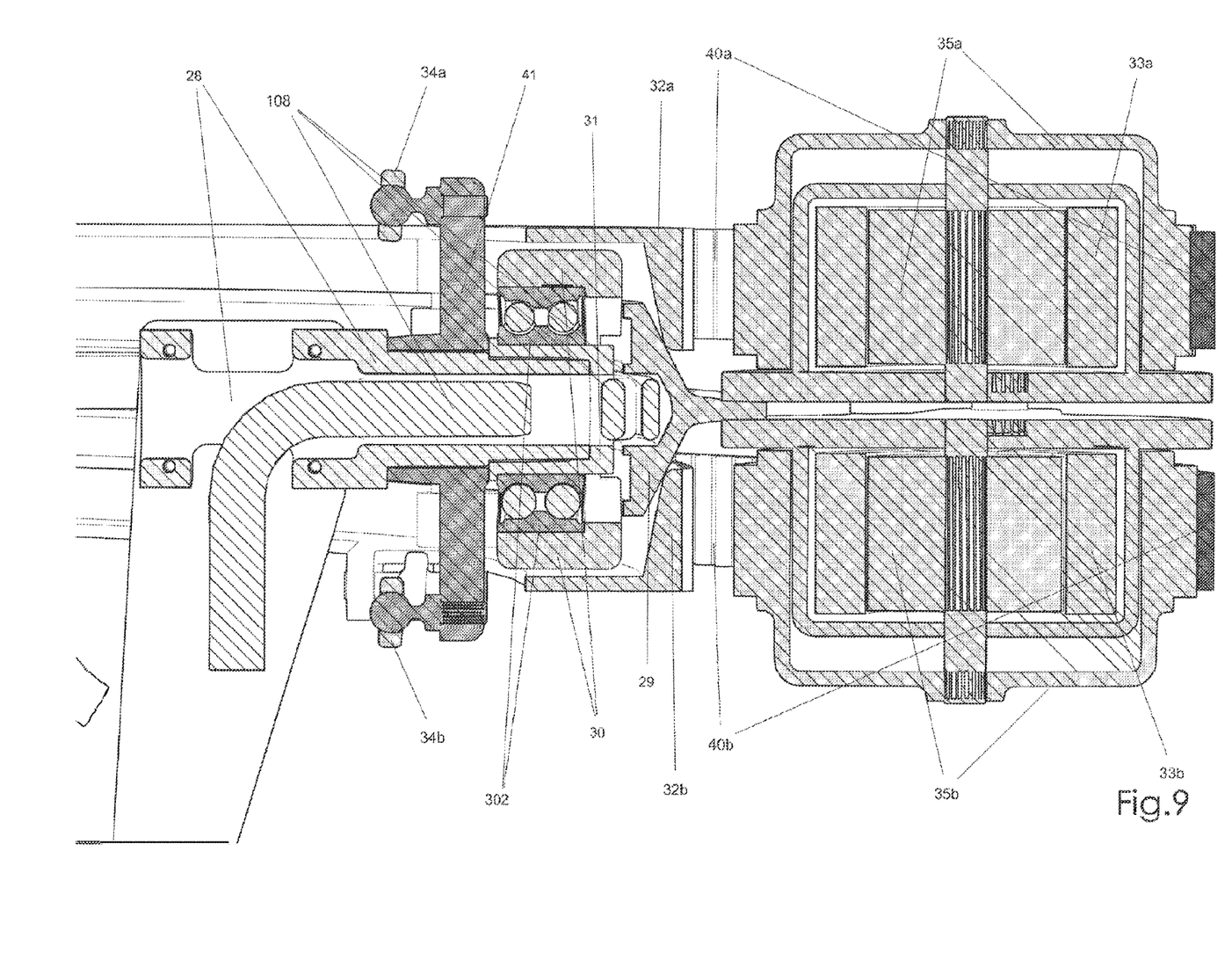
FIG. 9 is a detailing sectional view of the ARS of FIG. 1 showing the assembly of upper rim 32a and lower rim 3b with housing 29 and chassis 30 taken through the gears 35a, 35b and angular contact bearing 302.
Figure 10:
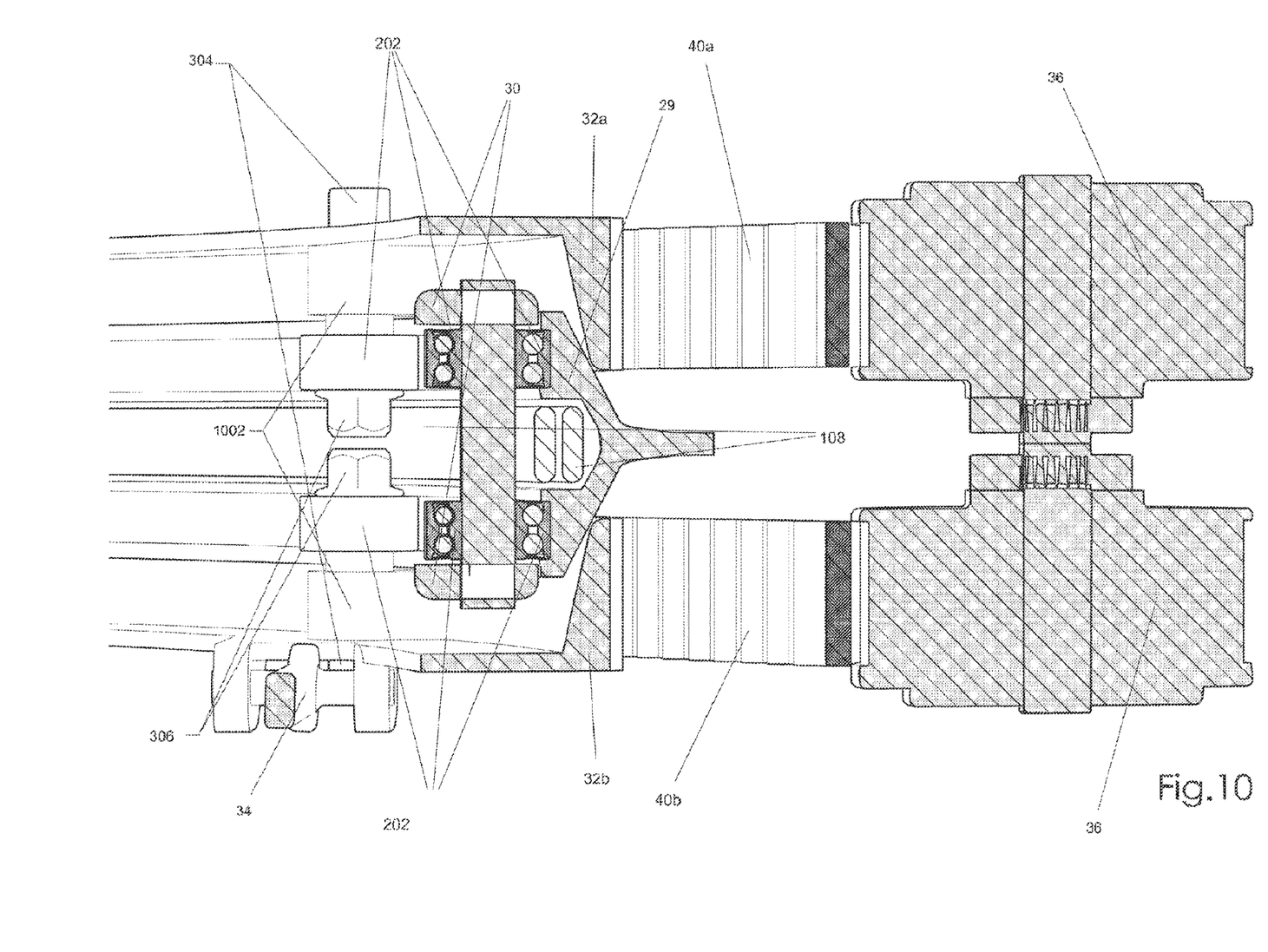
FIG. 10 is a detailing sectional view of the ARS of FIG. 1 through pretensioner rollers 36.

FIG. 8, through the arrows, details the one-way circular rotation of the ARS that allows a 360° horizontal rotation.

Embodiments may combine both working processes described above regarding rotation around the vertical axis and the horizontal axis together at different angles.

In order to better understand the working process described above, the following discussion decomposes the components shown in FIGS. 1-8. Specifically, embodiments of an ARS consistent with the present disclosure comprise a disc 29, with a revolving profile, which contains a channel for arranging the two wire cables 108 and their outputs. At the same time, the component 29, on the perimeter, has equidistant radially spaced clamping elements 204 that serve as a fixing zone to connect the ARS 100 to the wing or fuselage of an aircraft or other vehicle. Also, in the inner surface of housing 29 is provided with a pair of tracks for the movement of bearings 202; the bearings 202 affixed to the top rim 32a move along a top track while the bearings 202 affixed to the bottom rim 32b move about the bottom track.

In FIGS. 1-3 and 5-8, top rims 32a and 32b, which are discs, are illustrated, and on the outside of which are radially distributed coupling teeth and a clamping attachment for a lever 34a and 34b, and the revolving of which is described by the profile of a cornice with two non-parallel sides. On the interior of the rims 32a and 32b are located radially distributed extrusions, which serve to fix the bearings 202 which assures the rotation and fixation of the discs 32a and 32b on the tracks of component 29. Conceptually, rims 32a and 32b, in connection with housing 29, have a functioning principle and similar to that of a "Radial Bearing."

In FIGS. 1-3, 5-9, transmission belts 40a and 40b are illustrated which comprise evenly spaced teeth distributed along the length of the transmission link between the discs 32a and 32b with the gear wheels 35a and 35b which are rigidly fixed on the axis of the motors 33a and 33b. But the components 36 provide an optimal belt tensioning 40a and 40b.

Referring to FIGS. 2, 7, 8, and 9, two chassis 30 are distinguished, which are rolled by bearings 202 (also termed "angular contact bearings") on tracks on the inner surface of housing 29. In the chassis 30 is mounted an angular contact bearing, in which is mounted a component 31, on one side with a single component 41; on the other hand, the component 28 only fastens with the component 31.

The singular element 41, rigidly fixed to the component 28, which articulates by the levers 34a and 34b with the discs 32a and 32b, provides rotation and/or angle inclination to the horizontal plane of any ducted fan mounted within the ARS 360°. The component 28 is fixed in a series of conceptually variable elements 26 and 27 in FIG. 4, which serve to fix any ducted fans with the 360° ARS.

As shown, the ARS 360° device, in addition to being a rigid suspension for any build-in ducted fans in its passive state, is working on three distinctive scenarios.

First, changing the angle vertical positioning of the integrated ducted fan or any propulsion system, due to the opposite rotation of the independent motors 33a and 33b; coupled to toothed wheels 35a and 35b; connected with discs 32a and 32b; through belts 40a and 40b; moving the levers 34a and 34b which slopes elementally 41, obtaining a vertical rotation of the ducted fan propulsion system.

Second, changing the angle of horizontal positioning, due to the unison movement of all elements: 33a and 33b; 35a and 35b; 40a and 40b; and 41.

Third, a variable combination of scenarios 1 and 2.

In an embodiment, an ARS 360° in accordance with the present disclosure comprises a disc with a revolving profile that serves the base of consecutive mounting of all the construction elements of the device. The disk in its profile contains a cable channel for arranging and outputting two wires. At the same time, the disc on the perimeter has radially spaced equidistant clamping elements of the 360° ARS body, which serves to fix it on the wings or fuselage of any flying apparatus. Also, the profile of the disc has tracks for the movement of the bearings.

In an embodiment, an ARS 360° further comprises two discs, on the outside of which are radially distributed coupling teeth. A clamp for the joint of a lever; revolving is described by the profile of a cornice with two non-parallel sides; on the inside of the discs we find radially a few extrusions with the function of fixing the bearings for rotation and fixing them to the base plate tracks.

In an embodiment, an ARS 360° further comprises two existing standardized belts as part of the 360° ARS assembly; two toothed wheels with the tooth profile adapted to the coupling transmission belt; two existing reduction gears, standardized for the 360° ARS assembly; two chassis with rigid/semi rigid bearings; a geometric center with a cassette for mounting an angular bearing; two bushings with sharpened axes, strapped by a channel which on one side branches into three access channels; a two-arm crank specially fitted with articulated mounting areas and having a slit hole in the geometric middle; a slitted bush from the inside; and a bearing mounting area on the outside.

Each of the mentioned components is designed to be scalable and easily adapted to any required size. They could be made in varying proportions of light alloys, composite materials, rigid and flexible polymers.

Each of these embodiments and any obvious variation thereof is contemplated as falling within the spirit and scope of the claimed invention, which is set forth in the following claims. Moreover, the present concepts expressly include any and all combinations and sub-combinations of the preceding elements and aspects. The present disclosure is not limited to the specific illustrated example but extends to alternative embodiments and other shapes and/or configurations in accordance with the knowledge of one of ordinary skill in the art applied consistent with the presently disclosed principles.

What is claimed:

1. A mounting system for supporting a propulsion device, the mounting system comprising:
    a central housing comprising a channel on an inner surface thereof for receiving a wire, a top track on the inner surface, and a bottom track on the inner surface;
    a top rim comprising a first plurality of bearings, wherein each of the first plurality of bearings is received in the top track;
    a bottom rim comprising a second plurality of bearings, wherein each of the second plurality of bearings is received in the bottom track;
    a first chassis movably connected to the central housing;
    a first mounting bracket rotatably attached to the first chassis and configured to support the propulsion device;
    a second chassis movably connected to the central housing;
    a second mounting bracket rotatably attached to the second chassis and configured to support the propulsion device; wherein a first portion of the second mounting bracket is operatively connected to the top rim and a second portion of the second mounting bracket is operatively connected to the bottom rim.

2. The mounting system of claim 1, wherein the system further comprises a belt comprising a first plurality of teeth on an inner surface;
    wherein an outer surface of the top rim comprises a second plurality of teeth configured to engage the first plurality of teeth.

3. The mounting system of claim 2, wherein the mounting system further comprises a gear operatively connected to the belt.

4. The mounting system of claim 3, the mounting system further comprising a pair of rollers adjacent to the gear and each operatively connected to the belt.

5. The mounting system of claim 1, wherein a plurality of clamping elements extend from an outer surface of the central housing, wherein the clamping elements are configured to secure the mounting system to a vehicle.

6. The mounting system of claim 5, wherein the clamping elements are equidistantly spaced around the perimeter of the central housing.

7. The mounting system of claim 1, wherein the wire passes through an opening in the central housing.

8. The mounting system of claim 1, wherein the first mounting bracket and the second mounting bracket are each configured to rotate about a first axis.

9. The mounting system of claim 8, wherein the first chasses and the second chasses are each configured to travel around the inner surface of the central housing so as to move the first mounting bracket and the second mounting bracket about a second axis.

10. The mounting system of claim 1, wherein the propulsion device comprises a ducted fan.

11. A rotation system for use with a propulsion device, the rotation system comprising:
   a central disc having an outer surface comprising a radially spaced clamping element and an inner surface comprising a cable channel and a track; a wire in the cable channel;
   an upper exterior disc having a first plurality of coupling teeth radially distributed on an exterior surface;
   an upper wheel comprising a second plurality of coupling teeth;
   an upper belt having a third plurality of coupling teeth on an interior surface, wherein the third plurality of coupling teeth are configured to engage with the first plurality of coupling teeth and the second plurality of coupling teeth so as to couple the upper exterior disc to the upper wheel;
   a first chassis having one or more bearings configured to move about the track and a centrally disposed cassette to which the one or more bearings are mounted, wherein the cassette is configured to move about the central disc; and
   a first mounting bracket extending from the first chassis, wherein the first mounting bracket is configured to support the propulsion device.

12. The rotation system of claim 11, the rotation system further comprising:
   a lower exterior disc having a fourth plurality of coupling teeth radially distributed on an exterior surface;
   a lower wheel comprising a fifth plurality of coupling teeth; and
   a lower belt having a sixth plurality of coupling teeth on an interior surface, wherein the sixth plurality of coupling teeth are configured to engage with the fourth plurality of coupling teeth and the fifth plurality of coupling teeth so as to couple the lower exterior disc to the lower wheel.

13. The rotation system of claim 12, the rotation system further comprising a second chassis and a second mounting bracket extending from the second chassis, wherein the second mounting bracket is configured to support the propulsion device.

14. The rotation system of claim 13, wherein the upper exterior disc and the lower exterior disc are configured to rotate independently relative to the central disc.

15. The rotation system of claim 14, wherein the first mounting bracket comprises an upper portion coupled to the upper exterior disc and a lower portion coupled to the lower exterior disc.

16. The rotation system of claim 15, wherein the propulsion device is turned about a first axis when the upper exterior disc and the lower exterior disc rotate in the same direction about the central disc.

17. The rotation system of claim 16, wherein the propulsion device is turned about a second axis when the upper exterior disc and the lower exterior disc rotate in opposite directions about the central disc.

* * * * *